A. G. CURTIS.
AXLE-LUBRICATOR.

No. 177,212. Patented May 9, 1876.

WITNESSES:

INVENTOR:
A. G. Curtis
BY
ATTORNEYS.

UNITED STATES PATENT OFFICE.

ALFRED G. CURTIS, OF OTTAWA, ILLINOIS.

IMPROVEMENT IN AXLE-LUBRICATORS.

Specification forming part of Letters Patent No. 177,212, dated May 9, 1876; application filed March 28, 1876.

*To all whom it may concern:*

Be it known that I, ALFRED G. CURTIS, of Ottawa, in the county of La Salle and State of Illinois, have invented a new and Improved Combined Device for Greasing Axles; and I do hereby declare that the following is a full, clear, and exact description of the same, reference being had to the accompanying drawing, forming part of this specification, in which—

Figure 1:
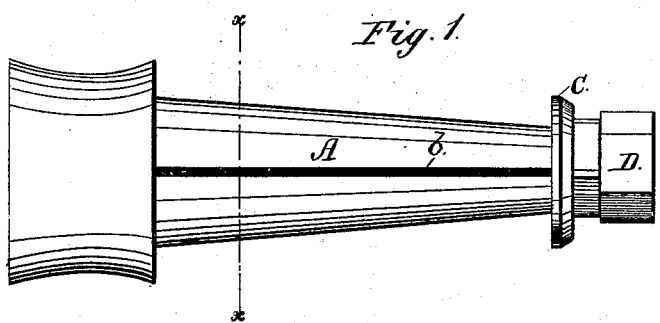
Figure 2:
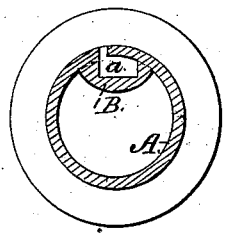
Figure 3:
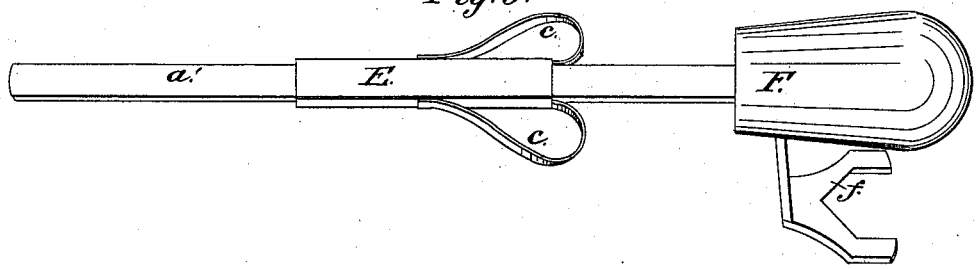

Figure 1 is a view of the axle-skein; Fig. 2, a transverse section through line $x\,x$; Fig. 3, a plan view of the plunger and filling-tube, slightly turned so as to show the wrench.

My invention relates to an improved construction of devices for lubricating the skein of vehicle-axles; and it consists in a filling-tube and a plunger fitting therein, which, together, are employed for charging a longitudinal reservoir in the axle-skein with grease, the said reservoir running the entire length of the skein, and opening through a slot upon the surface of the skein, by means of which construction the axle is rendered self-greasing until the reservoir is exhausted, and the latter may be refilled without taking off the wheel.

In the drawing, A represents the skein of an axle upon which the inner surface of the wheel-hub revolves. The said skein is made with a longitudinal reservoir, $a$, running the entire length of the skein and its screw-threaded extremity, and opening upon the surface of the skein through a narrow slot, $b$. This reservoir may be formed in the skein in any suitable manner. It may be cut in a solid skein, or the skein may be made hollow, as shown, and a longitudinal strip, B, cut out and fitted beneath the slot in the skein, so as to form the reservoir. This reservoir being filled with grease the vehicle will run for a long time without further lubrication. The grease oozes out gradually according to the wants of the vehicle.

If the bearings become dry and need lubricating the heat resulting from friction melts the grease and causes it to run, thus rendering the device automatic in its operation.

C is a flanged nut, which closes the end of the slot $b$, so as to prevent the grease from running out, and also serves to hold the wheel on. The said nut is screw-threaded interiorly and screws on to the screw-stem of the axle, and is backed by a screw-cap, D, which closes the end of the reservoir $a$, protects the end of the screw-stem from dirt, and operates as a check nut for the flanged nut C.

To charge the grease-reservoir I have provided a specially constructed device, which consists of a filling-tube, E, and a plunger, F. The filling-tube is made of about the size to fit nicely in the grease-reservoir, and is provided with handles $c$, by means of which it is held while being used. The plunger F consists of a handle with a long stem, $a'$, which is made to fit closely in the tube, so as to force out the grease into the reservoir of the skein. The plunger-handle is provided with a wrench, $f$, which is bent twice at right angles and attached to the said handle, so as to operate as a support for the handle to keep it clean when not used as a wrench.

After the reservoir-chamber has become exhausted of its supply of grease, it is filled again by unscrewing the cap D by means of the wrench, and the tube E being filled with grease and its end placed in the open end of the grease-reservoir, the plunger is inserted at the other end and its contents forced up into the grease-reservoir, which operation is repeated until a sufficient quantity has been inserted, after which the cap is screwed on. This arrangement, it will be seen, enables me to grease the skein while resting in the hub of the wheel, thus dispensing with the use of a lifting-jack, and the trouble of taking off the wheel.

Having thus described my invention, what I claim as new is—

1. The filling-tube E and plunger F, combined with each other and adapted to fit within the open end of a grease-reservoir, $a$, as and for the purpose described.

2. The plunger-handle, having a wrench, $f$, bent so as to form a support for the same, as described.

ALFRED G. CURTIS.

Witnesses:
 FRANK M. GENTZER,
 D. T. EHUROT.